United States Patent

Davis

(10) Patent No.: US 6,742,478 B1
(45) Date of Patent: Jun. 1, 2004

(54) ABSORBENT ANIMAL BEDDING MATERIAL AND METHOD OF MANUFACTURING AND USING SAME

(75) Inventor: James Stephen Davis, Wingate, NC (US)

(73) Assignee: Union Gypsum, Inc., Wingate, NC (US)

( * ) Notice: Subject to any disclaimer, the term of this patent is extended or adjusted under 35 U.S.C. 154(b) by 110 days.

(21) Appl. No.: 10/323,066

(22) Filed: Dec. 18, 2002

(51) Int. Cl.[7] .......................... A01K 29/00; A01K 1/015
(52) U.S. Cl. ........................ 119/526; 119/171
(58) Field of Search ............................ 119/171, 172, 119/173, 526; 71/15, 21, 22

(56) References Cited

U.S. PATENT DOCUMENTS

| | | | |
|---|---|---|---|
| 1,967,333 A | 7/1934 | Smith | |
| 2,597,457 A | 5/1952 | Cook | |
| 3,980,050 A | 9/1976 | Neubauer | |
| 4,559,073 A * | 12/1985 | Minato et al. ................ | 71/21 |
| 4,813,996 A * | 3/1989 | Gardner et al. .............. | 71/21 |
| 5,372,314 A | 12/1994 | Manning | |
| 5,741,346 A * | 4/1998 | Glover ........................ | 71/21 |
| 5,806,462 A | 9/1998 | Parr | |
| 5,819,688 A | 10/1998 | Walker | |
| 5,928,403 A | 7/1999 | Moore, Jr. | |
| 5,960,743 A | 10/1999 | Taylor | |
| 5,964,187 A | 10/1999 | Willis | |
| 6,060,086 A | 5/2000 | Belanus et al. | |
| 6,206,947 B1 | 3/2001 | Evans et al. | |
| 6,248,148 B1 | 6/2001 | Faulmann et al. | |
| 6,386,144 B1 | 5/2002 | Cathey | |
| 6,399,185 B1 | 6/2002 | Cathey | |
| 6,402,801 B1 | 6/2002 | Faulmann et al. | |
| 6,453,846 B2 * | 9/2002 | Lloyd ......................... | 119/171 |
| 2001/0029762 A1 * | 10/2001 | Steele et al. ................. | 71/63 |

OTHER PUBLICATIONS

Pilgrim's Pride: Live Production Update, Vol. 4, No. 3, Fall 2002; p. 5.

* cited by examiner

*Primary Examiner*—Charles T. Jordan
*Assistant Examiner*—Elizabeth Shaw
(74) *Attorney, Agent, or Firm*—Christine M. Meis; Quarles & Brady Streich Lang LLP

(57) ABSTRACT

An animal bedding material that includes a layer of substantially dry ground drywall and a layer of a substantially absorbent litter material. The ground drywall layer has a concentration of greater than 10 g/ft$^2$ and includes ground gypsum and ground paper backing. The ground drywall constituent of the bedding material helps control odor, acts as a moisture barrier, and provides a "lift" to the waste saturated litter material, which reduces compaction and extends the useful life of the bedding material.

20 Claims, 1 Drawing Sheet

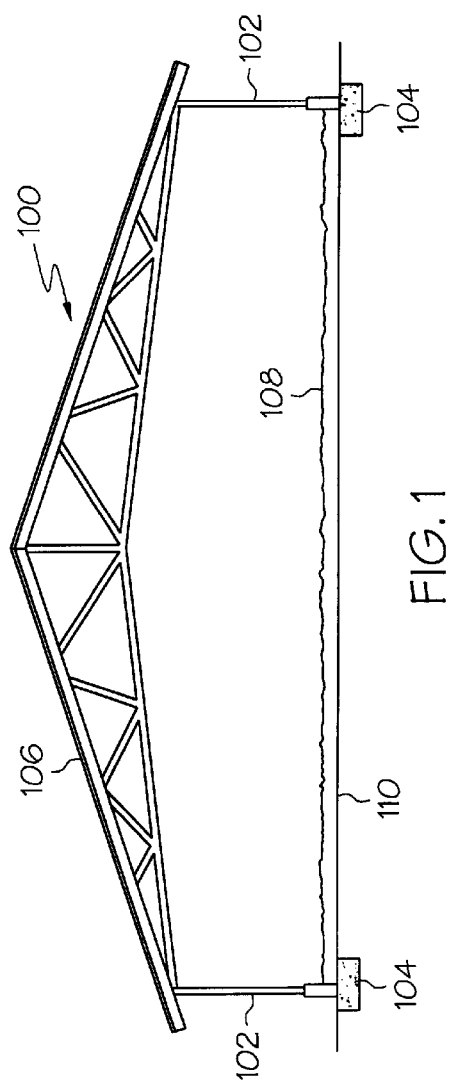
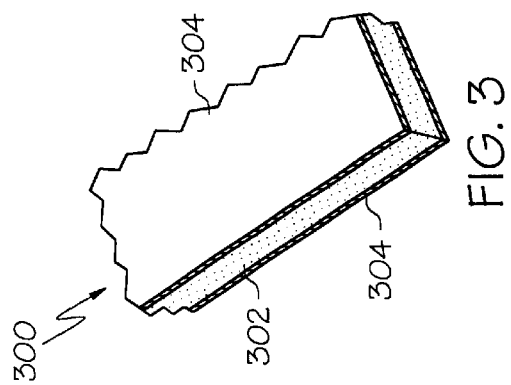
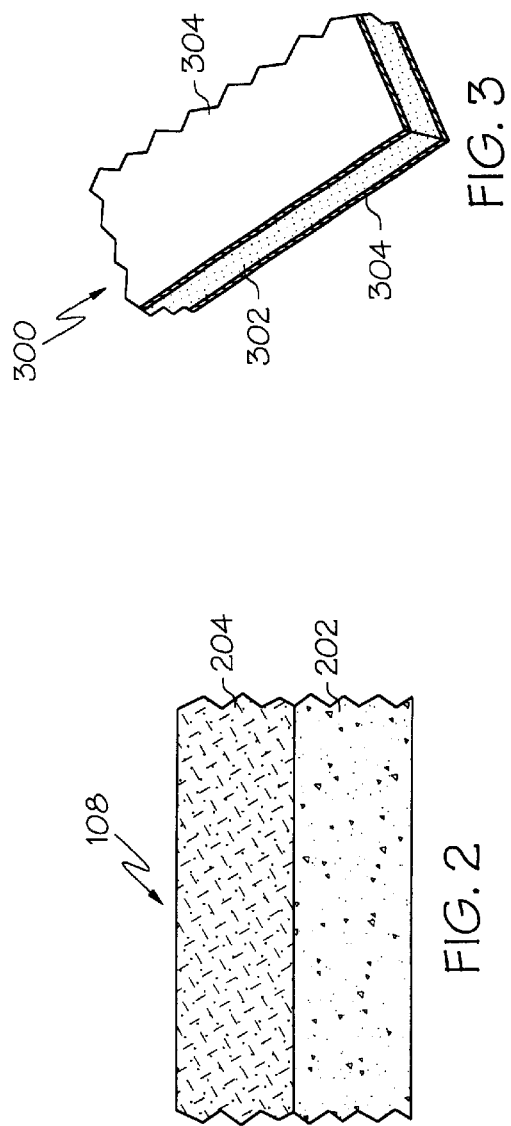

ABSORBENT ANIMAL BEDDING MATERIAL AND METHOD OF MANUFACTURING AND USING SAME

FIELD OF THE INVENTION

The present invention relates to absorbent animal bedding materials and, more particularly, to an absorbent bedding material that includes substantially dry ground drywall as a constituent and that is used for animals such as, for example, chickens in poultry grow houses.

BACKGROUND OF THE INVENTION

Animal bedding material is used in various environments to absorb animal waste. For example, many commercial poultry grow houses include bedding material on the grow house floor, to absorb the natural waste from the chickens, to thereby potentially enhance their health and growth. No matter the particular end use environment, the bedding material, in addition to being a relatively good waste product absorber, should preferably be relatively nonirritating to the animals that are exposed to the bedding material, as well.

In the past, many commercial poultry grow house bedding materials consisted of pine shavings and sawdust. However, in the recent past there has been an increase in the demand for, and a concomitant reduction in supply of, these materials. As a result, some commercial poultry growers have used alternative materials, such as kiln-dried hardwood, wood chips, rice and peanut hulls, chopped straw, shredded newspaper, and sand.

Although the above-mentioned materials are generally safe and useful as animal bedding materials, each suffers certain drawbacks. For example, some of the materials, while relatively absorbent, are relatively slow drying, and some can be relatively expensive. In addition, some of these materials are mixed with chemical additives to improve performance and/or reduce bacterial growth. However, these additives can be expensive and, in some instances, difficult to apply, which can further increase the cost of the bedding material.

Hence, there is a need for an animal bedding material that improves on one or more of the drawbacks mentioned above. Namely, a bedding material that is relatively absorbent and relatively quick drying, and/or is relatively inexpensive, and/or is not mixed with one or more chemical additives. The present invention addresses one or more of these needs.

SUMMARY OF THE INVENTION

The present invention provides an absorbent and quick drying animal bedding material that is relatively inexpensive, and is not mixed with one or more chemical additives. The bedding material uses substantially dry ground drywall as a constituent.

In one embodiment, and by way of example only, an absorbent animal bedding material includes a first layer of substantially dry ground drywall having a concentration of greater than 10 g/ft$^2$, and a second layer of a substantially absorbent litter material. The substantially dry ground drywall includes at least ground gypsum and ground paper backing.

In another exemplary embodiment, a method of making an absorbent animal bedding material includes grinding one or more pieces of drywall to produce substantially dry ground drywall including at least ground gypsum and ground paper backing. A first layer of the ground drywall having a concentration of greater than 10 g/ft$^2$ is applied on a surface, and a second layer of a substantially absorbent litter material.

In yet another exemplary embodiment, a method of using drywall that includes gypsum disposed between paper backing includes the step of grinding one or more pieces of the drywall to produce substantially dry ground drywall that includes at least the gypsum and the paper backing. An animal bedding material by is provided by applying a first layer of the ground drywall on an animal bedding surface at a concentration of greater than 10 g/ft$^2$, and applying a second layer of a substantially absorbent litter material. End user animals are introduced onto the bedding material following the application of the first and second layers.

In still another exemplary embodiment, a method of modifying a poultry grow house includes removing bedding material from at least one surface in the grow house. A layer of substantially ground drywall that includes at least ground gypsum and ground paper backing is applied on each of the surfaces at a concentration of greater than 10 g/ft$^2$. A layer of a substantially absorbent litter material is applied over the layer of ground drywall.

In yet still another exemplary embodiment, a poultry grow house includes a floor, a support structure surrounding at least a portion of the floor, a roof supported by at least a portion of the support structure, and animal bedding material spread across at least a portion of the floor. The animal bedding material includes a layer of substantially dry ground drywall having a concentration of greater than 10 g/ft$^2$ and including at least ground gypsum and ground paper backing, and a layer of a substantially absorbent litter material.

Other independent features and advantages of the preferred bedding material will become apparent from the following detailed description, taken in conjunction with the accompanying drawings which illustrate, by way of example, the principles of the invention.

BRIEF DESCRIPTION OF THE DRAWINGS

FIG. 1 is a simplified end view of an exemplary poultry grow house;

FIG. 2 is a cross section view of a bedding material according to an embodiment of the invention that may be used in the grow house of FIG. 1; and FIG. 3 is a perspective view of an exemplary piece of drywall that may be used to make the bedding material of FIG. 2.

DETAILED DESCRIPTION OF A PREFERRED EMBODIMENT

Many chickens that are bred and grown for commercial purposes are kept in poultry grow houses rather than, for example, wire cages. A simplified end view of an exemplary poultry grow house is illustrated in FIG. 1, and includes at least two sidewalls 102 supported on a foundation 104, and a trussed roof 106 that is supported by the sidewalls 102. A bedding material 108 is spread onto various bedding surfaces such as, for example, a floor 110 of the grow house 100, in order to absorb the natural waste the chickens produce.

The bedding material 108, as shown more clearly in FIG. 2, includes at least a layer of ground drywall 202 and a layer of an absorbent litter material 204. The ground drywall 202 is preferably made by grinding or committing either scrap, or new, pieces or sheets of drywall. An exemplary piece of drywall 300, before it has been ground, is shown in FIG. 3. The drywall 300 is constructed of a core material 302 disposed between, or completely enveloped by, a paper backing 304. The core material 302 is preferably composed substantially of gypsum, though other constituent elements could be present. To grind the drywall 300, the drywall pieces or sheets, with the paper backing 304 still on, are placed in any one of numerous grinding machines. Thus, the ground drywall 202 includes both the gypsum 302 and the paper backing 304. In a particular preferred embodiment, the drywall 300 is coarsely ground in a tub grinder using a ¾-inch screen. The tub grinder is preferably positioned under a dust-collector to minimize the spread of dust during the grinding process. Although, in the preferred embodiment, the drywall is coarsely ground, it will be appreciated that the drywall could be ground finer.

The absorbent litter material 204 that is used in combination with the ground drywall 202 may be any one of numerous animal litter materials known now, or in the future, including, but not limited to, kiln-dried hardwood, wood chips, wood shavings, rice hulls, peanut hulls, chopped straw, shredded newspaper, and sand. In a preferred embodiment, however, the litter material is sawdust. The sawdust may come from any one of numerous types of wood, but in a preferred embodiment, the sawdust is pine sawdust.

Returning once again to FIGS. 1 and 2, the bedding material 108 is placed on the grow house floor 110 by first spreading an approximately 2-inch layer of the ground drywall 202, and then spreading an approximately 2-inch layer of the absorbent litter material 204 over the ground drywall 202. The spreading of either, or both, the ground drywall 202 and the litter material 204, may be done using, for example, a spreader truck. It is to be appreciated that the thickness of the ground drywall 202 and litter material 204 layers could be more or less than 2-inches, and that these thicknesses are merely exemplary of a particular preferred embodiment. However, the ground drywall 202 layer should be of sufficient thickness to provide more than just a dusting of the bedding surfaces, such as would be expected if it were applied at a concentration of 10 g/ft², or less. Moreover, in the preferred embodiment, the ground drywall 202 is approximately 50%, by volume, of the total bedding in the grow house 100, though it is not limited to this volume percent.

It will additionally be appreciated that the layer of absorbent litter material 204 could be spread first, followed by the layer of ground drywall 202. However, spreading the ground drywall 202 first reduces the amount of drywall dust that is released when the bedding material 108 is spread in the grow house 100. Further, although the layer of litter material 204 is preferably overlaid directly on top of the layer of ground drywall 202, this configuration is not necessary. Rather, an additional layer of another type of absorbent material could be placed between the layer of ground drywall 202 and the layer of litter material 204.

In the embodiment depicted in FIGS. 1 and 2, when the bedding material 108 is first placed in the grow house 100, it is not blended together as a mixture. However, after the chickens are introduced into the grow house 100 and onto the bedding material 108, the ground drywall 202 and litter material 204 layers will begin blending together. After a while, the chickens will have blended the two layers together into a substantially homogeneous mixture. It will be appreciated that the ground drywall 202 and the litter material 204 could be pre-blended into a substantially homogeneous mixture, and then spread on the grow house bedding surfaces. With this alternative embodiment, the ground drywall 202 is preferably approximately 50%, by volume, of the bedding material 108, and the bedding material 108 is preferably spread to a thickness of approximately 4-inches. Again, it is to be appreciated that this thickness is merely exemplary of a preferred embodiment, and that other thicknesses could be used.

The above-described bedding material 108, which uses substantially dry ground drywall 202 as a constituent, is absorbent and quick drying, and is relatively inexpensive. The ground drywall 202 constituent of the bedding material 108 reduces the odors in the grow house 100, and acts as a moisture barrier for the grow house floor. The ground drywall also provides a "lift" to the waste saturated litter material 204, which reduces compaction and extends the useful life of the bedding material 108. The bedding material 108 also provides a utility for scrap drywall, which might otherwise go to waste.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

I claim:

1. An absorbent animal bedding material, comprising:
    a layer of substantially dry ground drywall having a concentration of greater than 10 g/ft² and including at least ground gypsum and ground paper backing; and
    a layer of a substantially absorbent litter material.

2. The bedding material of claim 1, wherein:
    the ground drywall layer is a base that is placed on a surface; and
    the litter material layer is overlaid directly on top of the first layer.

3. The bedding material of claim 1, wherein the ground drywall layer and the litter material layer each have a thickness of approximately 2 inches.

4. The bedding material of claim 1, wherein the ground drywall comprises approximately 50 volume-percent of the animal bedding material.

5. The bedding material of claim 1, wherein the litter material is wood.

6. The bedding material of claim 5, wherein the wood is at least one of wood chips, wood shavings, and sawdust.

7. The bedding material of claim 5, wherein the wood is pine.

8. A method of making an absorbent animal bedding material, comprising:
    grinding one or more pieces of drywall to produce substantially dry ground drywall including at least ground gypsum and ground paper backing;
    applying a layer of the substantially dry ground drywall having a concentration of greater than 10 g/ft² on a surface at a concentration of greater than 10 g/ft²; and
    applying a layer of a substantially absorbent litter material.

9. The method of claim 8, wherein the litter material layer is applied by overlaying it directly on top of the ground drywall layer.

10. The method of claim 8, further comprising:
blending the ground drywall layer and the litter material layer by introducing end user animals onto the bedding material following the application thereof.

11. The method of claim 8, wherein the ground drywall comprises approximately 50 volume-percent of the animal bedding material.

12. The method of claim 8, wherein the ground drywall layer and the litter material layer are each applied to a thickness of approximately 2 inches.

13. The method of claim 8, wherein the litter material is wood.

14. The method of claim 13, wherein the wood is at least one of wood chips, wood shavings, and sawdust.

15. The method of claim 13, wherein the wood is pine.

16. A method of using drywall that includes gypsum disposed between paper backing, the method comprising:
grinding one or more pieces of the drywall to produce substantially dry ground drywall including at least the gypsum and the paper backing;
providing an animal bedding material by:
applying a layer of the substantially dry ground drywall on an animal bedding surface at a concentration of greater than 10 g/ft$^2$, and applying a layer of a substantially absorbent litter material; and
introducing end user animals onto the bedding material following the application of the first and second layers.

17. A method of modifying a poultry grow house, comprising:
removing bedding material from at least one surface in the grow house;
applying a layer of ground drywall on each of the surfaces at a concentration of greater than 10 g/ft$^2$, the ground drywall including at least ground gypsum and ground paper backing and being substantially dry when applying the first layer; and
applying a layer of a substantially absorbent litter material over the layer of ground drywall.

18. A poultry grow house, comprising:
a floor;
a support structure surrounding at least a portion of the floor;
a roof supported by at least a portion of the support structure; and
animal bedding material spread across at least a portion of the floor, the animal bedding material comprising:
a layer of substantially dry ground drywall having a concentration of greater than 10 g/ft$^2$ and including at least ground gypsum and ground paper backing; and
a layer of a substantially absorbent litter material.

19. An absorbent animal bedding material for application on bedding surfaces of a poultry grow house, comprising:
substantially dry ground drywall including at least ground gypsum and ground paper backing; and
a substantially absorbent litter material,
wherein the ground drywall and the litter material are blended together to form a substantially homogeneous composition prior to the application on the poultry grow house bedding surfaces.

20. The bedding material of claim 19, wherein the ground drywall comprises approximately 50 volume-percent of the animal bedding material.

\* \* \* \* \*